United States Patent
Kumada et al.

(10) Patent No.: US 6,643,029 B2
(45) Date of Patent: *Nov. 4, 2003

(54) IMAGE PROCESSING METHOD, IMAGE PROCESSING APPARATUS AND COMPUTER READABLE MEMORY

(75) Inventors: Shuichi Kumada, Yokohama (JP); Kenichi Ohta, Kawasaki (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/084,122

(22) Filed: May 26, 1998

(65) Prior Publication Data

US 2001/0043376 A1 Nov. 22, 2001

(30) Foreign Application Priority Data

May 27, 1997 (JP) .............................................. 9-137123
Apr. 9, 1998 (JP) ........................................... 10-097733

(51) Int. Cl.[7] .......................... G06F 15/00; G03F 3/08; G06K 9/00
(52) U.S. Cl. ......................... 358/1.9; 358/518; 382/167
(58) Field of Search ................................ 358/504, 518, 358/523, 1.9, 520, 524, 527, 535, 406, 468, 448, 525, 515; 382/167, 162

(56) References Cited

U.S. PATENT DOCUMENTS

| 5,053,866 | A | * | 10/1991 | Johnson | 358/75 |
|---|---|---|---|---|---|
| 5,081,529 | A | | 1/1992 | Collette | 358/80 |
| 5,146,328 | A | * | 9/1992 | Yamasaki et al. | 358/164 |
| 5,212,546 | A | * | 5/1993 | Arazi et al. | 358/518 |
| 5,377,025 | A | * | 12/1994 | Spaulding et al. | 358/518 |
| 5,491,568 | A | * | 2/1996 | Wan | 358/518 |
| 5,502,580 | A | * | 3/1996 | Yoda et al. | 358/518 |
| 5,521,723 | A | * | 5/1996 | Madden et al. | 358/501 |
| 5,760,913 | A | * | 6/1998 | Falk | 358/298 |
| 5,781,206 | A | * | 7/1998 | Edge | 347/19 |
| 5,809,213 | A | * | 9/1998 | Bhattacharjya | 395/106 |
| 5,815,291 | A | * | 9/1998 | Shono et al. | 358/504 |
| 5,881,211 | A | * | 3/1999 | Matsumura | 395/109 |
| 5,956,044 | A | * | 9/1999 | Giorgianni et al. | 345/431 |
| 6,100,999 | A | * | 8/2000 | Ikegami | 358/1.9 |
| 6,522,778 | B1 | * | 2/2003 | Tamagawa | 382/167 |

FOREIGN PATENT DOCUMENTS

| EP | 0 501 334 | 9/1992 |
|---|---|---|
| EP | 0 653 879 | 5/1995 |
| EP | 0 741 491 | 11/1996 |
| JP | 9-98299 | 4/1997 |

OTHER PUBLICATIONS

Office Action dated Sep. 9, 2002 in Japanese Application No. 10-097733.

* cited by examiner

Primary Examiner—Madeleine Nguyen
(74) Attorney, Agent, or Firm—Fitzpatrick, Cella, Harper & Scinto

(57) ABSTRACT

Disclosed are a highly versatile image processing method and apparatus wherein it is possible to preview an image that takes into account a change in the color reproduction characteristic of an output device with the passage of time, as well as a computer readable memory storing a program for executing this preview processing. A printer that outputs an image is calibrated in regard to its image output characteristic and a set of one-dimensional LUTs that conforms to the color reproduction characteristic of the printer is generated. On the basis of the set of one-dimensional LUTs, the content of a set of one-dimensional LUTs, which is used when PCS data that has been stored in a profile corresponding to the printer is converted to data dependent upon the printer, is modified, and another set of one-dimensional LUTs, which is used when data dependent upon the printer is converted to PCS data, is modified.

21 Claims, 11 Drawing Sheets

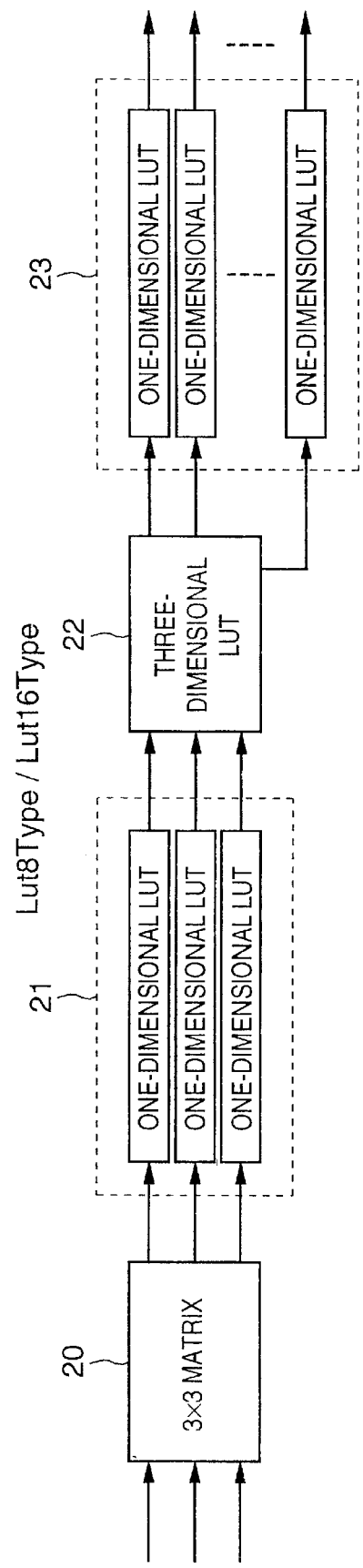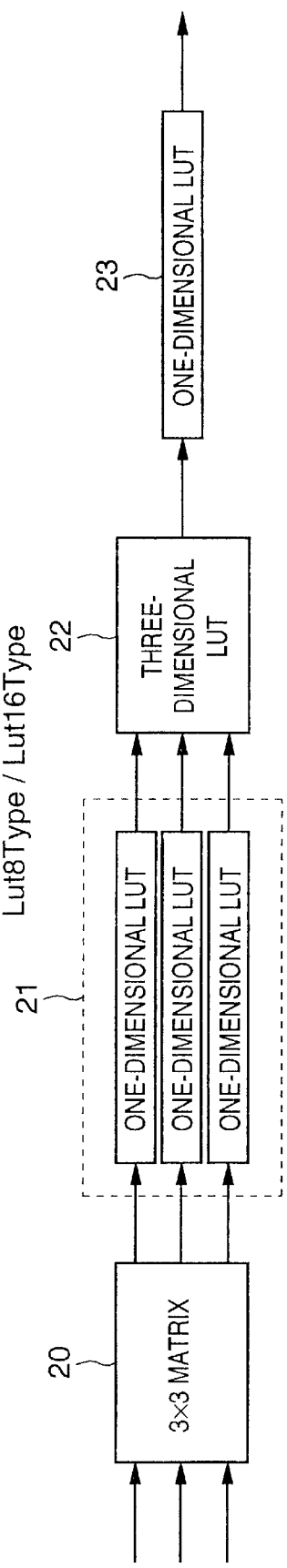

IMAGE PROCESSING METHOD, IMAGE PROCESSING APPARATUS AND COMPUTER READABLE MEMORY

BACKGROUND OF THE INVENTION

This invention relates to an image processing method, an image processing apparatus and a computer readable memory. More particularly, the invention relates to an image processing method, an image processing apparatus and a computer readable memory for matching the color expressions of input and output devices having different color characteristics.

In order to achieve color matching between image data entered by an input device such as a monitor or scanner and image data output by an output device such as a color ink-jet printer based upon the entered image data, there is a known image processing system in which data (referred to as "profile data" below) that describes the input/output characteristics of various input/output devices is retained in the form of a database. The image processing system executes processing between the input image data and the output image data utilizing input/output profile data, which corresponds to these input/output devices, in actual image processing such as color matching.

ICC (International Color Consortium) profile data is well known as an industrial standard and is an example of profile data used in such an image processing system.

In regard to each item of profile data, a color space (Profile Connection Space, or PCS) that is independent of input/output devices is defined by CIE XYZ color space or CIE L*a*b* color space. The intermediate color space is established to make possible color matching between various input and output devices by performing processing in two steps, namely by making a conversion from color space dependent upon the input device to PCS and then making a conversion from PCS to color space dependent upon the output device. One PCS is defined for the data of each profile.

In regard to the data of each profile, data composed of a 3-input N-output look-up table or the like is retained as a database for performing the conversion from PCS to the color space dependent upon the input/output device or the conversion from the color space dependent upon the input/output device to PCS. These items of data are referred to in actual image processing such as color matching and either the data referred to is output or, in certain cases, interpolated data obtained by applying interpolation processing to the same data is output.

Further, in regard to the data of each profile, data consisting of a 3-input 1-output look-up table or the like is retained as a database which indicates whether a color specified by PCS is capable of being reproduced by the input/output devices. These items of data are referred to in color-reproduction range examination processing, which is for determining whether a specific color is capable of being reproduced by a certain input/output device, and either the data referred to is output or, in certain cases, interpolated data obtained by applying interpolation processing to the same data is output.

The structure of the data referred to at the time of such image processing as color matching is referred to as being of the Lut8Type or Lut16Type in regard to ICC profile data and, as shown in FIG. 9A, is composed of a 3×3 matrix 20, a set 21 of three one-dimensional look-up tables (one-dimensional LUTs), a three-dimensional look-up table (three-dimensional LUT) 22 having $d_0 \times d_0 \times d_0$ grid points each of which possesses N components, and a set 23 of N one-dimensional look-up tables (one-dimensional LUTs), where N represents the number of components in the color space of the output device. For example, N is equal to 3 in RGB color space and 4 in CMYK color space. Further, $d_0$ represents the number of grid points along each color-space axis of the three-dimensional LUT.

Similarly, the structure of the data referred to at the time of such image processing as color matching is referred to as being of the Lut8Type or Lut16Type in regard to ICC profile data and, as shown in FIG. 9B, is composed of a 3×3 matrix 20, a set 21 of three one-dimensional LUTs, a three-dimensional LUT 22 having $d_1 \times d_1 \times d_1$ grid points each of which possesses one component, and a one-dimensional LUT 23, where $d_1$ represents the number of grid points along each color-space axis of the three-dimensional LUT.

Consider a case where an image displayed on a color monitor in which color space is defined by RGB space is output to a color printer in which color space is defined by CMYK space. In accordance with the example of the prior art described above, first the RGB data is converted to device-independent PCS (RGB→PCS) in accordance with the processing flow shown in FIG. 9A, then PCS is converted to CMYK data (PCS→CMYK) in similar fashion in accordance with the processing flow shown in FIG. 9B.

However, since the 3×3 matrix is used in the initial step of processing, this matrix can be employed in the RGB→PCS conversion but not in a CMYK→PCS conversion. Accordingly, the processing procedure is used upon modifying a part of the procedure in such a manner that the data defined in PCS will enter the one-dimensional LUT as is. By contrast, in a case where the printer that outputs the image handles image data that has been defined in YMC space, this matrix can be used.

Thus, with the processing of the prior art, there are cases where the standard processing procedure can be used as is and cases where it must be used after being partially modified, depending upon how the color space of the output device is defined. Such a processing technique lacks versatility.

In order to provide a preview of an output, it is necessary that an image be displayed on a color monitor, in which color space is defined by RGB, so as to reflect the output characteristic of the printer serving as the output device. To achieve this, it is desired that the image be output by performing the color space conversion by following a process that is the reverse of above-described process RGB→PCS, PCS→CMYK. In order to execute such processing, it would be ideal if the color-space matching processing also possessed a reversible characteristic.

In addition, the color reproduction characteristic of a printer varies depending upon the aging of the very components that construct the printer. For example, if the printer is a laser printer, the color reproduction characteristic varies owing to a change in the optical characteristic of the semiconductor laser, the reflection characteristic of the photosensitive drum, etc., with the passage of time.

Furthermore, regardless of the type of color matching processing executed, it is vital that the user of the apparatus executing this processing know in advance the kind of image processing being executed. It is required that the type of processing being executed be managed accurately at all times especially in an image processing system composed of various input and output devices.

SUMMARY OF THE INVENTION

Accordingly, an object of the present invention is to provide an image processing method and apparatus wherein it is possible to preview an image that takes into account a change in the color reproduction characteristic of an output device with the passage of time, as well as a computer readable memory storing a program for executing this preview processing.

According to one aspect of the present invention, the foregoing object is attained by providing an image processing method comprising a generating step of executing calibration of an output device, which outputs an image, in regard to an image output characteristic thereof, and generating a set of one-dimensional LUTs that conforms to a color reproduction characteristic of the output device, a first modifying step of modifying, on the basis of the set of one-dimensional LUTs, content of a first set of one-dimensional LUTs used when device-independent data that has been stored in a profile corresponding to the output device is converted to data dependent upon the output device, and a second modifying step of modifying, on the basis of the set of one-dimensional LUTs, a second set of one-dimensional LUTs used when data dependent upon the output device is converted to device-independent data.

The profile includes an output profile that describes the output characteristic of the output device, and the output profile includes, as color processing data for converting the device-independent data to the data dependent upon the output device, (1) a first 3×3 matrix, (2) a first set of three one-dimensional LUTS, (3) a first three-dimensional LUT, and (4) a first set of N one-dimensional LUTs, and further includes, as color processing data for converting the data dependent upon the output device to the device-independent data, (1) a second set of N one-dimensional LUTs, (2) a second N-dimensional LUT, (3) a second set of three one-dimensional LUTs, and (4) a second 3×3 matrix.

The image processing method may further comprise a step of converting the device-independent data to the data dependent upon the output device by applying processing using (1) the first 3×3 matrix, (2) the first set of three one-dimensional LUTS, (3) the first three-dimensional LUT and (4) the first set of N one-dimensional LUTs in the order mentioned.

The image processing method may further comprise a step of converting the data dependent upon the output device to the device-independent data by applying processing using (1) the second 3×3 matrix, (2) the second set of three one-dimensional LUTs, (3) the second N-dimensional LUT and (4) the second set of N one-dimensional LUTs in the order mentioned.

The profile further includes an input profile that describes a display characteristic of a display device that displays an image, and the input profile includes, as color processing data for converting the device-independent data to the data dependent upon the display device, a third 3×3 matrix and a third set of N one-dimensional LUTs.

The image processing method may further comprise a step of converting the device-independent data to the data dependent upon the display device by applying processing using the third 3×3 matrix and the third set of N one-dimensional LUTs in the order mentioned.

Here the output device is a printer and it is preferred that the data used by the printer be defined by CMYK space and that the device-independent data be defined by XYZ space. Further, the display device is a display monitor and it is preferred that the data used by the display monitor be defined by RGB space.

Further, it is preferred that the set of one-dimensional LUTs be stored together with calibration information but separately from the profile.

The image processing method may further comprise a transfer step of transferring the set of one-dimensional LUTs to a device driver corresponding to the output device.

According to another aspect of the present invention, the foregoing object is attained by providing an image processing apparatus comprising generating means for executing calibration of an output device, which outputs an image, in regard to an image output characteristic thereof, and generating a set of one-dimensional LUTs that conforms to a color reproduction characteristic of the output device, first modifying means for modifying, on the basis of the set of one-dimensional LUTs, content of a first set of one-dimensional LUTs used when device-independent data that has been stored in a profile corresponding to the output device is converted to data dependent upon the output device, and second modifying means for modifying, on the basis of the set of one-dimensional LUTs, a second set of one-dimensional LUTs used when data dependent upon the output device is converted to device-independent data.

According to still another aspect of the present invention, the foregoing object is attained by providing a computer readable memory storing an image processing program, comprising codes for executing calibration of an output device, which outputs an image, in regard to an image output characteristic thereof, and for executing processing for generating a set of one-dimensional LUTs that conforms to a color reproduction characteristic of the output device, codes for executing processing for modifying, on the basis of the set of one-dimensional LUTS, content of a first set of one-dimensional LUTs used when device-independent data that has been stored in a profile corresponding to the output device is converted to data dependent upon the output device, and codes for executing processing for modifying, on the basis of the set of one-dimensional LUTs, a second set of one-dimensional LUTs used when data dependent upon the output device is converted to device-independent data.

In accordance with the above-described aspects of the present invention, calibration processing in regard to the image output characteristic of an output device that outputs an image is executed and a set of one-dimensional LUTs that conforms to the color reproduction characteristic of the output device is generated. On the basis of the set of one-dimensional LUTs, the content of a first set of one-dimensional LUTs, which is used when device-independent data that has been stored in a profile corresponding to the output device is converted to data dependent upon the output device, is modified, and a second set of one-dimensional LUTs, which is used when data dependent upon the output device is converted to device-independent data, is modified.

Another object of the present invention is to provide an image processing method and apparatus wherein it is possible to execute color matching processing having a high degree of versatility.

According to one aspect of the present invention, the foregoing object is attained by providing an image-processing method comprising a generating step of applying calibration processing to an output device that outputs an image, and generating a set of one-dimensional LUTs that conforms to a color reproduction characteristic of the output device, a storing step of storing the generated set of one-dimensional LUTs separately of a profile that describes an output characteristic of the output device into a memory, a modifying step of modifying, on the basis of the set of one-dimensional LUTs when color matching processing is executed using the profile, content of the set of one-dimensional LUTs used when device-independent data that has been stored in the profile corresponding to the output device is converted to data dependent upon the output device, and a color matching execution step of executing color matching processing using the profile that has been modified at the modifying step.

According to another aspect of the present invention, the foregoing object is attained by providing an image processing apparatus comprising generating means for applying calibration processing to an output device that outputs an image, and generating a set of one-dimensional LUTs that conforms to a color reproduction characteristic of the output device, first storage means for storing the set of one-dimensional LUTs generated by the generating means, second storage means for storing a profile that describes an output characteristic of the output device, modifying means for modifying, on the basis of the set of one-dimensional LUTs when color matching processing is executed using the profile, content of the set of one-dimensional LUTs used when device-independent data that has been stored in the profile corresponding to the output device is converted to data dependent upon the output device, and color matching execution means for executing color matching processing using the profile that has been modified by the modifying means.

According to still another aspect of the present invention, the foregoing object is attained by providing a computer readable memory storing an image processing program, comprising codes for applying calibration processing to an output device that outputs an image, and for executing processing for generating a set of one-dimensional LUTs that conforms to a color reproduction characteristic of the output device, codes for executing processing for storing the generated set of one-dimensional LUTs separately of a profile that describes an output characteristic of the output device into a memory, codes for executing processing for modifying, on the basis of the set of one-dimensional LUTs when color matching processing is executed using the profile, content of the set of one-dimensional LUTs used when device-independent data that has been stored in the profile corresponding to the output device is converted to data dependent upon the output device, and codes for executing color matching processing using the profile that has been modified.

In accordance with the above-described aspects of the present invention, calibration of an output device that outputs an image is executed and a set of one-dimensional LUTs that conforms to the color reproduction characteristic of the output device is generated. The set of one-dimensional LUTs that has been generated is stored separately of a profile that describes the output characteristic of the output device. On the basis of the set of one-dimensional LUTs when color matching processing is executed using the profile, the content of a first set of one-dimensional LUTs, which is used when device-independent data that has been stored in the profile corresponding to the output device is converted to data dependent upon the output device, is modified, and color matching processing is executed using the profile that has been modified.

Still another object of the present invention is to provide an image processing method and apparatus capable of executing color matching processing that takes into account a change in the color reproduction characteristic of an output device with the passage of time and further capable of managing a profile necessary for processing to accomplish this, as well as a computer readable memory storing a program for executing this management.

According to one aspect of the present invention, the foregoing object is attained by providing an image processing method comprising a storage step of storing a plurality of profiles used in color matching processing into a memory, a setting step of setting management information for each of the plurality of profiles based upon an instruction from a user, and a management step of managing the profiles based upon the management information that has been set.

According to another aspect of the present invention, the foregoing object is attained by providing storage means for storing a plurality of profiles used in color matching processing, setting means for setting management information for each of the plurality of profiles based upon an instruction from a user, and management means for managing the profiles based upon the management information that has been set by the setting means.

The management information may indicate whether modification of a profile is allowed or not. The setting means preferably has a graphical user interface for allowing the user to enter instruction.

According to still another aspect of the present invention, the foregoing object is attained by providing a computer readable memory storing an image processing program, comprising codes for executing processing for storing a plurality of profiles used in color matching processing into a memory, codes for executing processing for setting management information for each of the plurality of profiles based upon an instruction from a user, and codes for executing processing for managing the profiles based upon the management information that has been set.

In accordance with the above-described aspects of the present invention, a plurality of profiles used in color matching are stored, management information for each of the plurality of profiles is set based upon an instruction from the user and the profiles are managed based upon the management information that has been set.

The invention is particularly advantageous since the color reproduction characteristic of an output device obtained by performing calibration processing in regard to the image output characteristic of the output device is reflected when device-independent data is converted to data that depends upon output device or when data that depends upon output device is converted to device-independent data. As a result, it is possible to preview an image that reflects the aging of the image output device.

Further, in accordance with the present invention, it is possible to execute color matching processing that conforms to a color reproduction characteristic reflecting the aging of the output device, and a profile for performing this processing can be managed at will.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 9A and 9B are block diagrams showing the composition of databases according to the prior art;

DESCRIPTION OF THE PREFERRED EMBODIMENTS

Preferred embodiments of the present invention will now be described in detail in accordance with the accompanying drawings.

The construction of an apparatus used in all of several embodiments set forth below as well as the structure of a profile will be described first.

<Common Embodiment>

Figure 1:
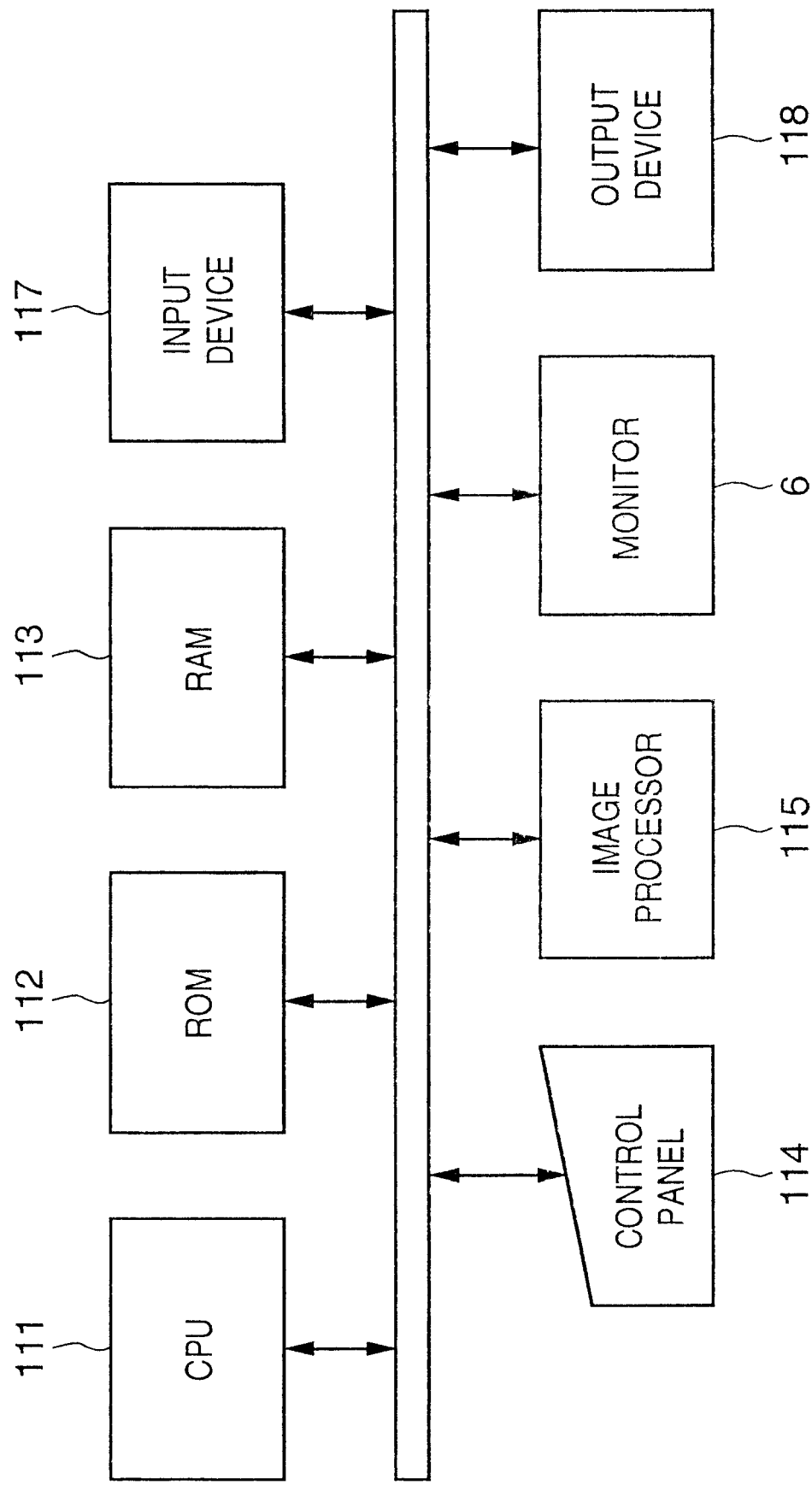
FIG. 1 is a block diagram illustrating the general construction of an image processing apparatus used in all of the embodiments of the present invention.

FIG. 1 is a block diagram illustrating an overview of the construction of an image processing apparatus according to a typical embodiment of the present invention.

The apparatus includes a CPU 111 for controlling a RAM 113, a control panel 114, an image processor 115, a monitor 6, an input device 117 and an output device 118 in accordance with information (profiles, etc.), control programs, an operating system, application programs (referred to as "applications" below), a CMM (Color Management Module) and device drivers, etc. stored in a ROM 112. The input device 117 inputs an image by an image reader such as an image scanner that includes a CCD sensor or by an external device such as a host computer, still-video camera or video camera, etc., as well as the associated interface. The output device 118 outputs an image by an ink-jet printer, a thermal-transfer printer or a dot printer, etc. The RAM 113 has a work area and a temporary saving area for various control programs and for data which is input from the control panel 114. The control panel 114 is for setting an output device setting unit 7, described later, and for entering data. The image processor 115 executes image processing performed in embodiments described later. The monitor 6 displays the results of processing executed by the image processor 115 as well as data entered by the control panel 114.

The details of construction and operation of the image processor 115 will now be described with reference to FIG. 2.

Figure 2:
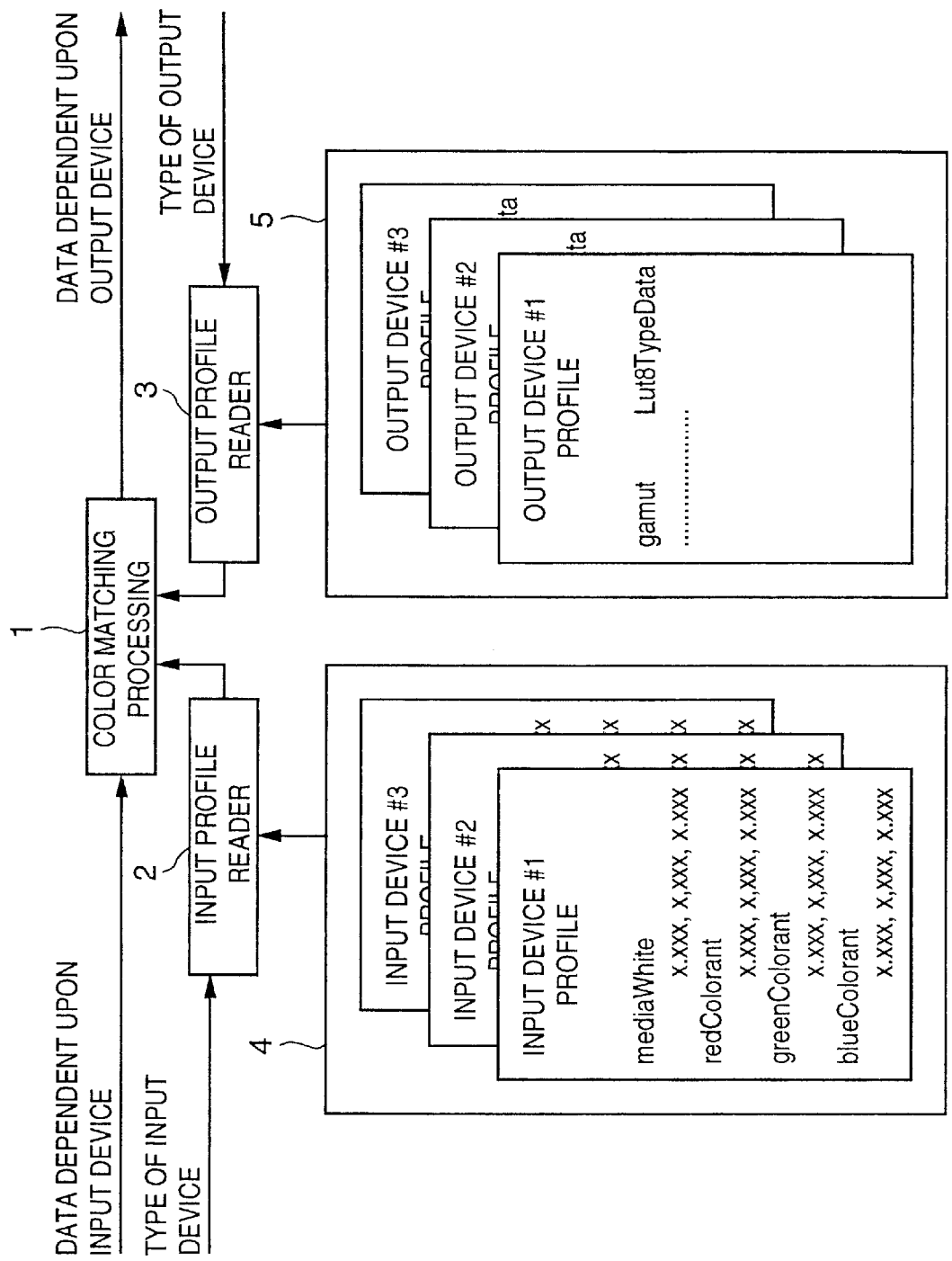
FIG. 2 is a block diagram illustrating the flow of processing of an image processor executed based upon a CMM (Color Management Module)

FIG. 2 is a block diagram illustrating the flow of processing of an image processor executed based upon a CMM (Color Management Module).

A color matching processor 1, which executes color matching processing, converts data entered via the operating system and dependent upon the input device 117 to data dependent upon the output device 118.

Input devices 117 connected to this image processing apparatus are of a plurality of different types. A signal ("type of input device"), which indicates from which type of input device an input is received from, enters an input profile reader 2. In response, the input profile reader 2 reads input profile data, in which the input characteristic of the input device 117 corresponding to the particular type is described, out of an input profile memory 4.

Output devices 118 connected to this image processing apparatus are of a plurality of different types. A signal ("type of output device"), which indicates from which type of output device an output is produced, a signal ("type of recording medium"), which has been set in the output device corresponding to the particular type, a signal indicating "set binarization method", a signal indicating "resolution" and a signal ("type of ink"), which indicates the type of ink used in the producing the output, enter an output profile reader 3. In response, the output profile reader 3 reads output profile data out of an output profile memory 5. The output profile data describes the output characteristic corresponding to the output device 118, which corresponds to the particular type, and to various settings of the output device.

The input profile memory 4, which is provided in the ROM 112, stores plural items of input profile data that describe the input characteristics of various input devices 117 connected to this image processing apparatus in advance. A single item of input profile data corresponding to the input device 117 connected to the image processing apparatus is read out of the input profile memory 4 by the input profile reader 2.

The output profile memory 5, which is provided in the ROM 112, stores plural items of output profile data that describe output characteristics conforming to various setting of various output devices 118 connected to this image processing apparatus in advance. A single item of output profile data corresponding to the output device 118 connected to the image processing apparatus and to various settings of the output device is read out of the output profile memory 5 by the output profile reader 3.

Figure 3:
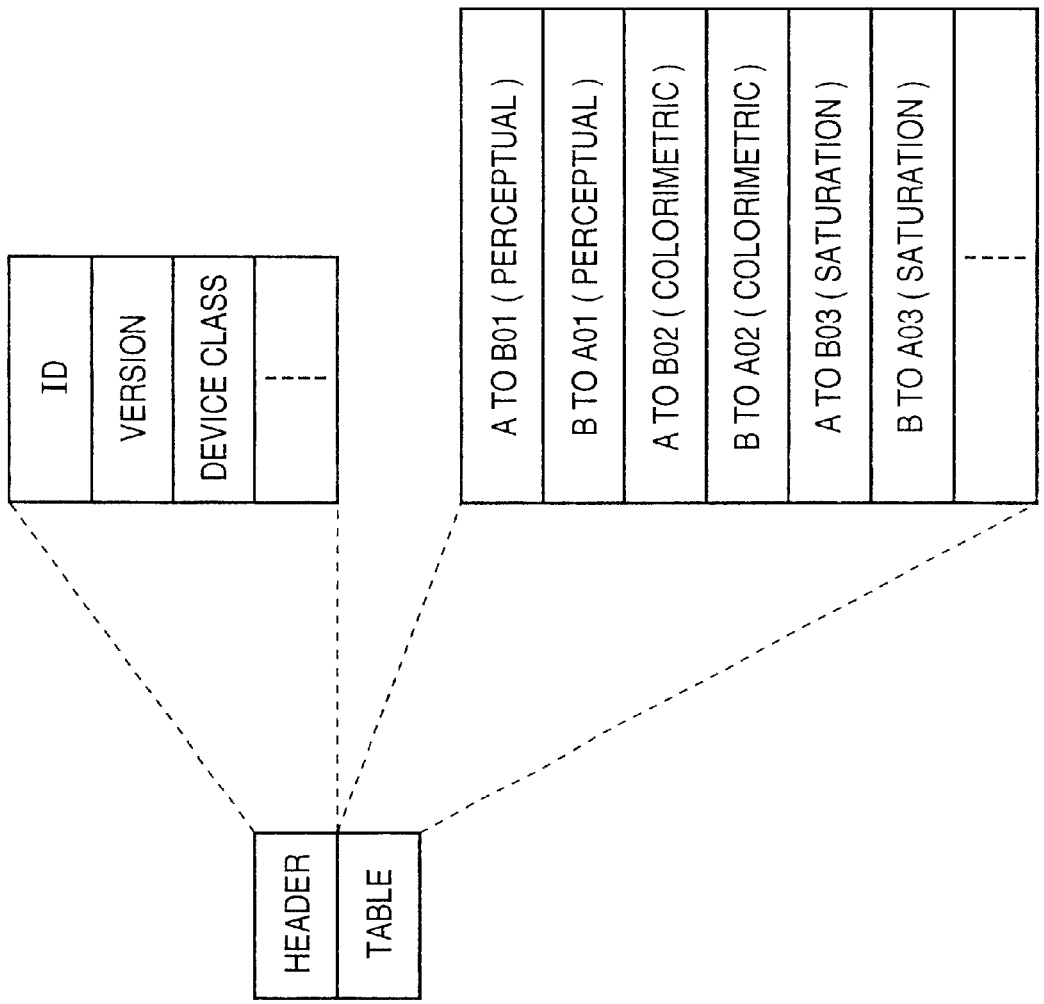
FIG. 3 is a diagram illustrating an overview of a printer profile.

FIG. 3 is a diagram illustrating an overview of a printer profile.

A profile has a header in which basic information relating to various profiles is described, and a table in which information used in color matching processing is described. For example, the header stores ID information, version information and device class information that indicates the basic type of the device. The table stores "B to A" information and "A to B" information. The "B to A" information describes color processing parameters relating to processing of the kind shown in FIGS. 9A and 9B for converting image data in PCS independent of the device to image data dependent upon the color space of a certain device. The "A to B" information describes color processing parameters relating to processing of the kind shown in FIG. 4 (described later) for converting image data dependent upon the color space of a certain device to image data in PCS independent of the device.

The "B to A" information and "A to B" information is stored in correspondence with the color matching method (perceptual, colorimetric and saturation) supported by the CMM (Color Management Module). The perceptual method is color matching suitable for images such as photographs and places emphasis upon color tones. The calorimetric method is color matching suitable for images such as logos and the purpose thereof is to reproduce matching colors calorimetrically. The saturation method is color matching that is suitable for images such as graphs and computer graphics and emphasizes color sharpness. In order to distinguish which color processing parameters shown in FIG. 3 correspond to which color matching method, the following numbers have been affixed to the parameters: "01" to perceptual, "02" to calorimetric and "03" to saturation.

<First Embodiment>

Figure 4:
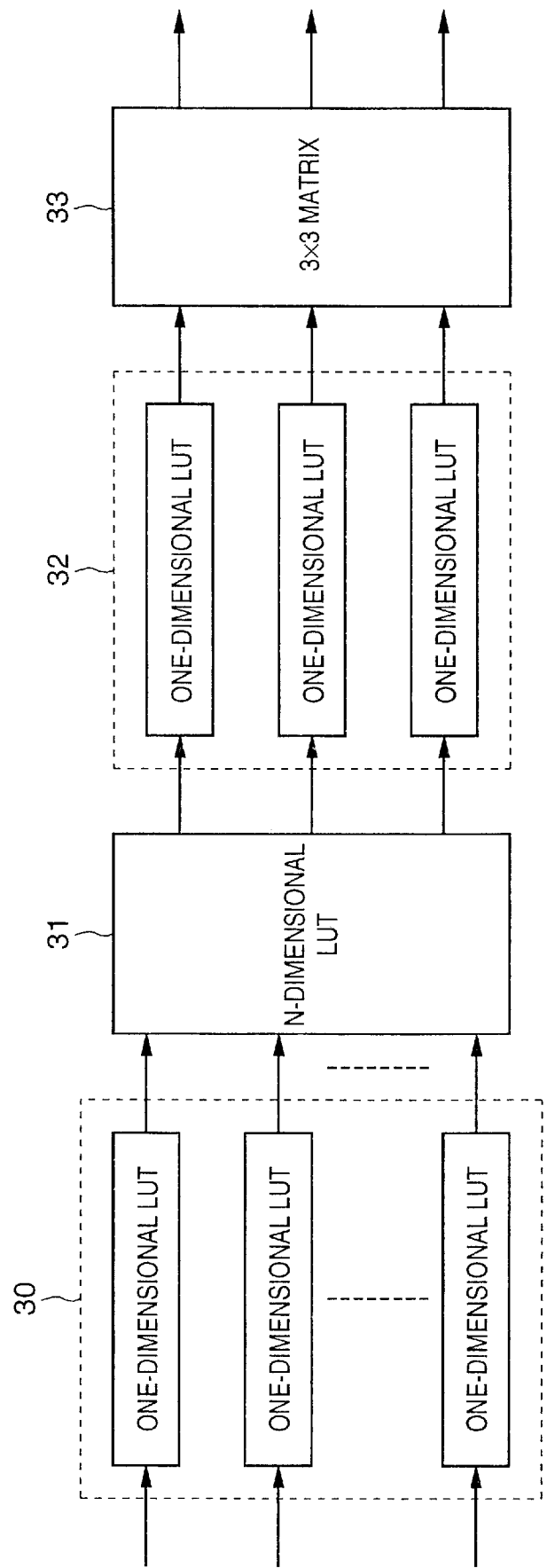
FIG. 4 is a diagram illustrating a flow of processing based upon "A to B" information in accordance with a first embodiment of the invention.

FIG. 4 is a diagram illustrating flow of processing based upon the "A to B" information in accordance with this embodiment.

Processing based upon the "A to B" information corresponds to processing that is the reverse of the processing shown in FIGS. 9A and 9B based upon the "B to A" information. The processing based upon the "A to B" information uses a set 30 of N one-dimensional LUTs, an N-dimensional LUT 31 having $d_0 \times d_0 \times d_0$ grid points each of which possesses M components, a set 32 of M one-dimensional LUTS, and a 3×3 matrix 33, where N represents the number of components in the color space of the output device to which this profile corresponds. This number is the same as the number of one-dimensional LUTs (or the same as the number of output elements of the three-dimensional LUT 22) shown in FIGS. 9A and 9B.

In accordance with processing based upon the "A to B" information in this embodiment, processing starts from the set 30 of N one-dimensional LUTs. Regardless of the number of input components, therefore, each set of LUTs and the matrix can be used effectively without any limit being imposed on processing and irrespective of the number of input elements.

Figure 5:
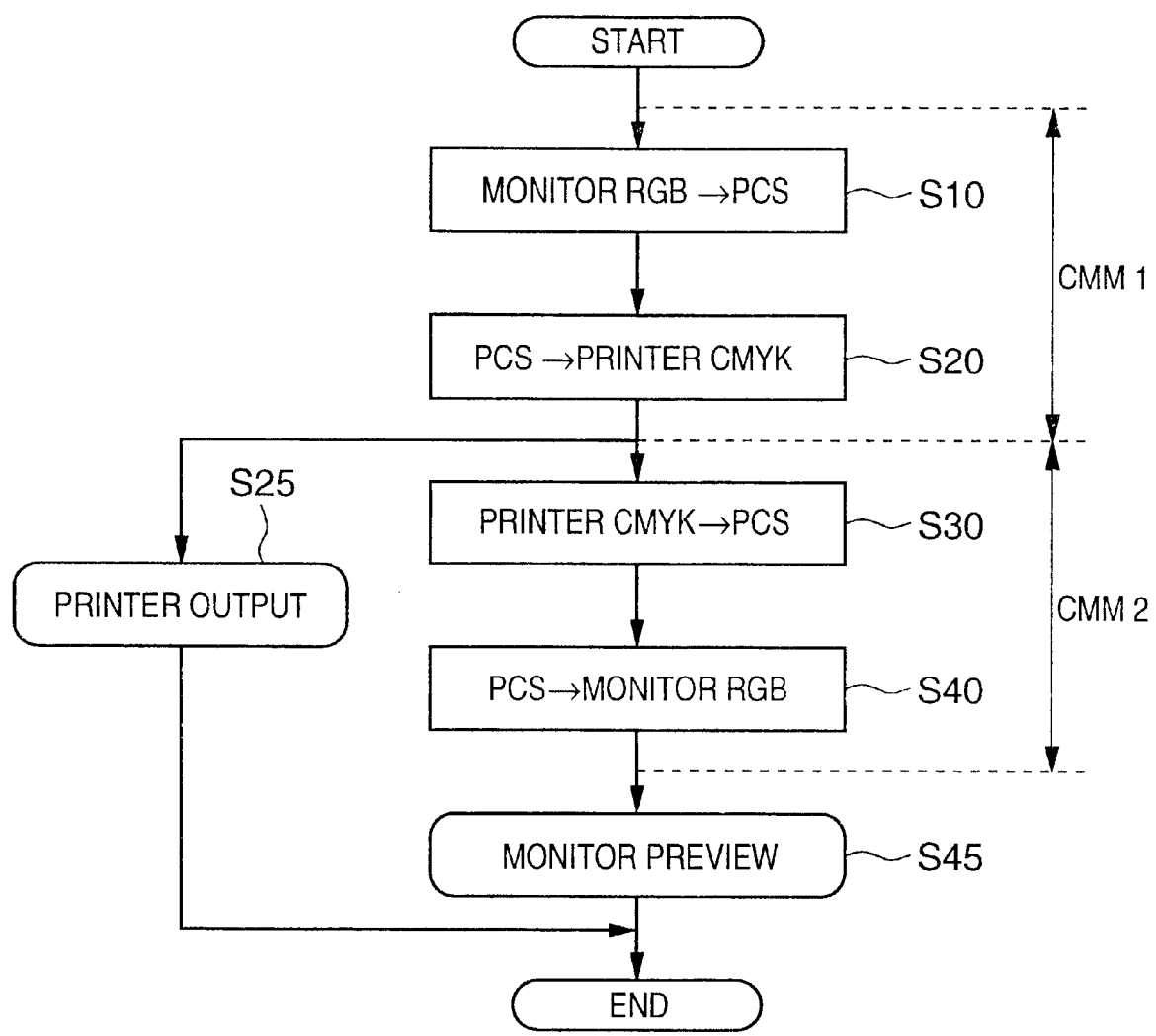
FIG. 5 is a flowchart illustrating a color matching processing procedure.
Figure 6:
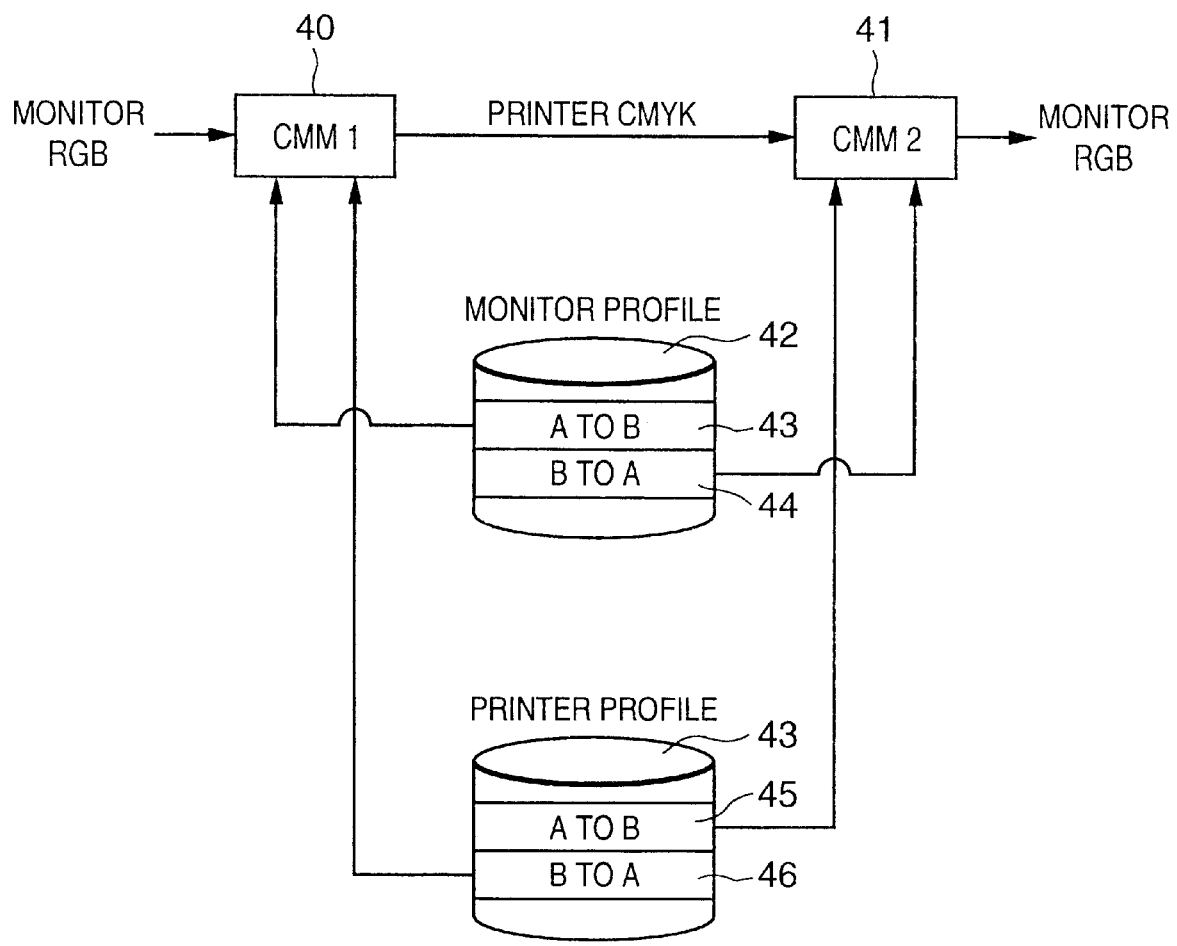
FIG. 6 is a diagram showing color transformation processing for a monitor RGB→printer CMYK→monitor RGB conversion.

Color matching processing relating to image formation processing and preview processing using the printer profile shown in FIG. 3 will now be described with reference to FIGS. 5 and 6.

Steps S10, S20 represent processing for converting RGB data (monitor RGB), which is dependent upon the characteristic of a monitor serving as an input device that displays an input image generated by a DTP (Desktop Publishing) application or the like via an operating system, to CMYK data (printer CMYK) dependent upon the characteristic of a printer serving as an output device. The module which executes this processing is "CMM1".

According to this processing, a monitor profile 42 is read out by the input profile reader 2, "A to B" information 43 from the monitor profile is set in the CMM1, a printer profile 43 is read out by the output profile reader 3 and "B to A" information 46, which conforms to a specified color matching method, from the printer profile is set in the CMM1.

The "A to B" information 43 stores the set 30 of three one-dimensional LUTs, which executes inverse gamma processing conforming to the gamma characteristic of the monitor serving as the input device, and the 3×3 matrix 33, which converts RGB data defined in standard space to XYZ data. In this case processing using the N-dimensional LUT 31 and the set 32 of M one-dimensional LUTs is skipped and not executed.

The "B to A" information 46, on the other hand, stores the 3×3 matrix 20, which is for converting image data defined in XYZ space to image data in L*a*b* space, the set 21 of one-dimensional LUTs, the three-dimensional LUT 22, which subjects the image data to color matching and effects a conversion to within the color reproduction limits of the printer, and the set 23 of one-dimensional LUTs, which performs a gamma correction conforming to the tone characteristic of the printer.

Monitor RGB is converted to XYZ data (PCS data) based upon the "A to B" information 43 at step S10. This XYZ data is then converted to printer CMYK based upon the "B to A" information 46 at step S20.

In a case where image processing is image formation processing, the printer CMYK is output to the output device 118 such as a printer at step S25 and color matching is terminated. By contrast, if the image processing is preview processing, then step S20 is followed by the processing of steps S30, S40. The image data obtained as the result of this processing is output to the monitor 6 at step S45.

Steps S30, S40 represent processing for converting CMYK data (printer CMYK), which is generated by the CMM1 and dependent upon the characteristic of the printer serving as the output device, to RGB data dependent upon the monitor serving as the device for displaying the preview image. The module which executes this processing is "CMM2".

First a printer profile 43 is read out by the input profile reader 2, "A to B" information 45, which conforms to the above-mentioned specified color matching method, from the printer profile 43 is set in the CMM2, the monitor profile 42 is read out by the output profile reader 3 and "B to A" information 44 from the monitor profile 42 is set in the CMM2.

The "A to B" information 45 has data used in order to perform conversion processing in accordance with the procedure shown in FIG. 4 and stores the set 30 of one-dimensional LUTs, which perform processing that is the inverse of the conversion processing that uses the set 23 of one-dimensional LUTs for the gamma correction conforming to the printer tone characteristic, the N-dimensional LUT 31, which is used to convert CMYK data processed by the set 30 of one-dimensional LUTs to data defined in L*a*b* space based upon the printer color reproduction characteristic, the set 32 of one-dimensional LUTs, which converts the data defined in L*a*b* space, to data (PCS data) in XYZ space, and the 3×3 matrix 33.

On the other hand, the "B to A" information 44 stores the 3×3 matrix 20, which performs processing that is the inverse of the conversion processing by the 3×3 matrix 33, and the set 23 of one-dimensional LUTs, which performs a monitor gamma correction that corresponds to processing that is the inverse of the conversion processing using the set 30 of one-dimensional LUTs.

At step S30, printer CMYK is converted to XYZ data (PCS data) using the "A to B" information 45. At step S40, the PCS data is converted to monitor RGB based upon the "B to A" information 44, and the monitor RGB is output to the monitor 6.

By virtue of such preview processing, the image that will be formed by the output device 118 can be verified beforehand on the monitor 6.

In accordance with above-described embodiment, therefore, processing based upon the "A to B" information is arranged to correspond to processing that is the reverse of that based upon the "B to A" information. As a result, there is no limitation on the number of input components and a high degree of universality is achieved even in processing that uses the "A to B" information and without changing the processing procedure, as is required in the prior art. Each LUT set and the matrix can be used effectively irrespective of the number of input components of the image data.

For example, it is possible to efficiently execute preview processing using the "A to B" information in which CMYK data, for which the number of components is four, is adopted as the input data.

Described next will be calibration processing for changing data that has been stored in a printer profile used in the above-described embodiment to data that conforms to the current state of the printer.

The color reproduction characteristic of a printer varies depending upon the environment in which it is installed and with the passage of time. Accordingly, the amount of change is measured, a correction coefficient is obtained and this is stored in the printer profile.

In order to measure the amount of change, patches of eight tones are formed by the monochromatic components of CMYK and the colors are measured using colorimetry means such as a scanner. By comparing the data indicative of the measured colors and the data of each patch stored in advance, a CMYK one-dimensional LUT for correcting the amount of change in each color component of CMYK is generated. Calibration processing for generating this LUT is disclosed in the specification of Japanese Patent Application No. 8-42856.

The CMYK one-dimensional LUT thus generated is reflected in each of the sets 23 of one-dimensional LUTs of "B to A" information stored in the printer profile shown in FIG. 3, and information such as the date on which the calibration processing was performed is added onto the header.

Furthermore, a set of one-dimensional LUTs for performing processing that is the inverse of the conversion processing using the set of CMYK one-dimensional LUTs generated by the calibration processing is obtained and this set of one-dimensional LUTs is reflected in each of the sets 30 of one-dimensional LUTs of "B to A" information in the printer profile.

Thus, in accordance with this embodiment, the set 23 of one-dimensional LUTs and the set 30 of one-dimensional LUTs are corrected by calibration processing. As a result, color matching processing that conforms to the color reproduction characteristic of the printer can be executed at all times. This makes it possible to provide the user with a high-quality image at all times. In addition, it is possible to execute highly accurate preview processing in which the output characteristic of the printer is always reflected correctly.

<Second Embodiment>

When the printer set forth in the first embodiment is being used as a local printer having a one-to-one relationship with respect to the host, it does not matter if the profile of the output device is rewritten by processing in accordance with the first embodiment. However, in a case where a plurality of printers of the same type (e.g., printer A 51 and printer A 52) are connected to a network 51, as shown for example in FIG. 7, the host uses the printer profile (profile 74, which is supported by the printers A) of the identical printers (the printers A) as the common profile for the plurality of printers (e.g., printers A51 and A52). This means that when the data that has been stored in a printer profile that conforms to the color reproduction characteristic of a specific printer (e.g., printer A 51) is rewritten, it is not possible to perform proper color matching processing that conforms to the color reproduction characteristic of another printer (printer A 52 in FIG. 7).

In view of this problem, the host computer 50 in this embodiment uses an operating system (OS) 71 to manage various programs and data such as an application 70 that executes DTP processing and calibration processing, etc., a group 60 of printer drivers (61, 62 and 63 corresponding to printers A 51, A 52 and B 53, respectively,) corresponding to the printers capable of being utilized via the network 55, such as a LAN, a color management module (CMM) 72 for performing the color matching processing described in the foregoing embodiment, and a printer file 73, etc., and executes calibration processing using the application, printing processing using the printer driver and color matching processing using the CMM 72 by means of a CPU (not shown) under the control of the operating system 71.

In other words, using the calibration function possessed by the application 70, the host 50 subjects the specified printer to the calibration processing described in the first embodiment and generates CMYK one-dimensional LUTs for the set 23 of one-dimensional LUTs and CMYK one-dimensional LUTs for the set 30 of one-dimensional LUTs.

Next, the CMYK one-dimensional LUTs thus generated are transferred, together with the above-described calibration information, to the printer driver that corresponds to the printer specified via the operating system. This printer driver stores the calibration information and the generated CMYK one-dimensional LUTs in correlated form in any memory area.

Figure 8:
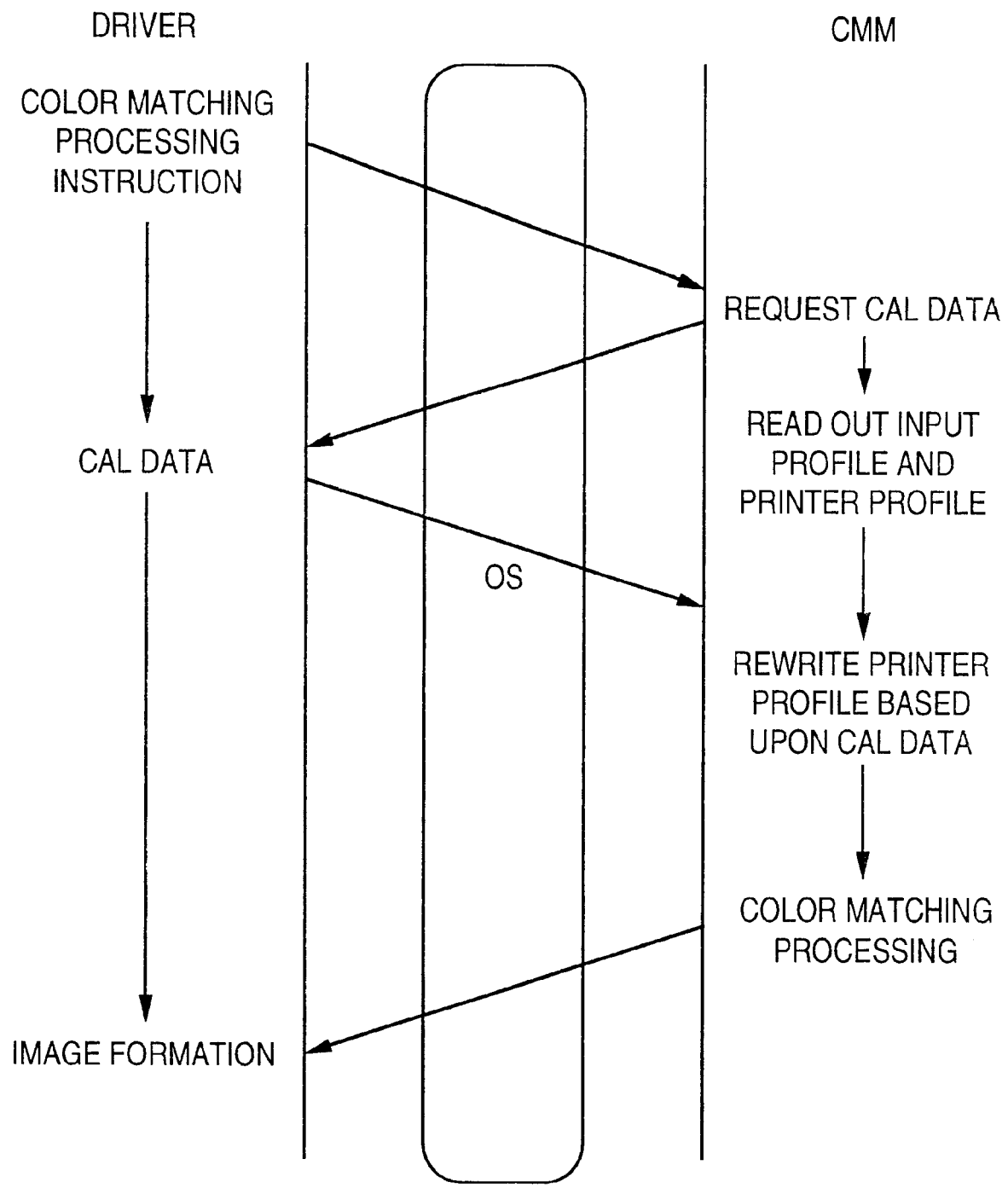
FIG. 8 is a diagram showing an exchange of information between a printer driver and the CMM.

Color matching processing using the CMYK one-dimensional LUTs thus stored will now be described with reference to FIG. 8. It should be noted that this color matching processing is executed while the CMM 72 and printer driver 60, which corresponds to the printer that forms the image, cooperate via the intermediary of the operating system 71.

First, if image formation processing accompanying color matching processing is designated by the user of the apparatus or by the host, the driver instructs the CMM 72 to perform color matching processing. In response, on the basis of the designation made, the CMM 72 requests the driver for CMYK one-dimensional LUTs (CAL data) generated by the calibration processing and reads the input profile and printer profile (output profile) out of the printer profile 73, as illustrated in FIG. 2. The driver transfers the CMYK one-dimensional LUTs (CAL data) generated by the calibration processing and stored in any memory area to the CMM 72.

The CMM 72 rewrites the printer profile, which has been read out, on the basis of the CMYK one-dimensional LUTs (CAL data) transferred as described in the first embodiment and executes color matching. The driver outputs the printer CMYK, which has undergone color matching processing and been transferred from the CMM 72, to the printer, whereby an image is formed.

In accordance with this embodiment as described above, profiles for various types of printers stored in the printer profile 73 are not modified by CMYK one-dimensional LUTs (CAL data) generated by calibration processing. As a result, color matching processing conforming to the color reproduction characteristics of each of a plurality of printers can be executed without the calibration processing of a certain single printer having an influence upon the output characteristics of other printers of the same type.

In a case where a printer is connected to the host 50 locally, it goes without saying that an arrangement may be adopted in which the printer profile corresponding to this local printer can be rewritten based upon CMYK one-dimensional LUTs (CAL data) generated by calibration processing. For example, it may be so arranged that the management conditions of each profile can be set by the user through a GUI furnished by the application 70, and the CMM 72 performs management, in accordance with management conditions set by the user, to determine whether or not a printer profile that has been stored in the profile 73 should be rewritten based upon the CMYK one-dimensional LUTs (CAL data) generated by calibration processing. In this case it may be so arranged that information relating to the management method is stored in the header of the printer profile.

Adopting this expedient makes it possible to manage a profile that conforms to the particular usage by the user.

<Third Embodiment>

In the second embodiment, calibration processing is executed by the application 70 of the host. As described for example in the specification of U.S. patent application Ser. No. 08/426,275 (filed on Apr. 21, 1995), recent printers have an internal calibration function whereby calibration processing can be executed automatically, and CMYK one-dimensional LUTs (CAL data) can be created, in dependence upon any change in environment internally of the printer. However, even if a printer has such a function, the results of calibration are reflected only in internal processing of the printer and are not fed back to the host.

This embodiment takes the foregoing into account and will be described in regard to a case in which when a printer having a calibration function is used upon being connected via a network, color matching processing is executed by the host making effective use of the results of calibration obtained by the printer.

Figure 7:
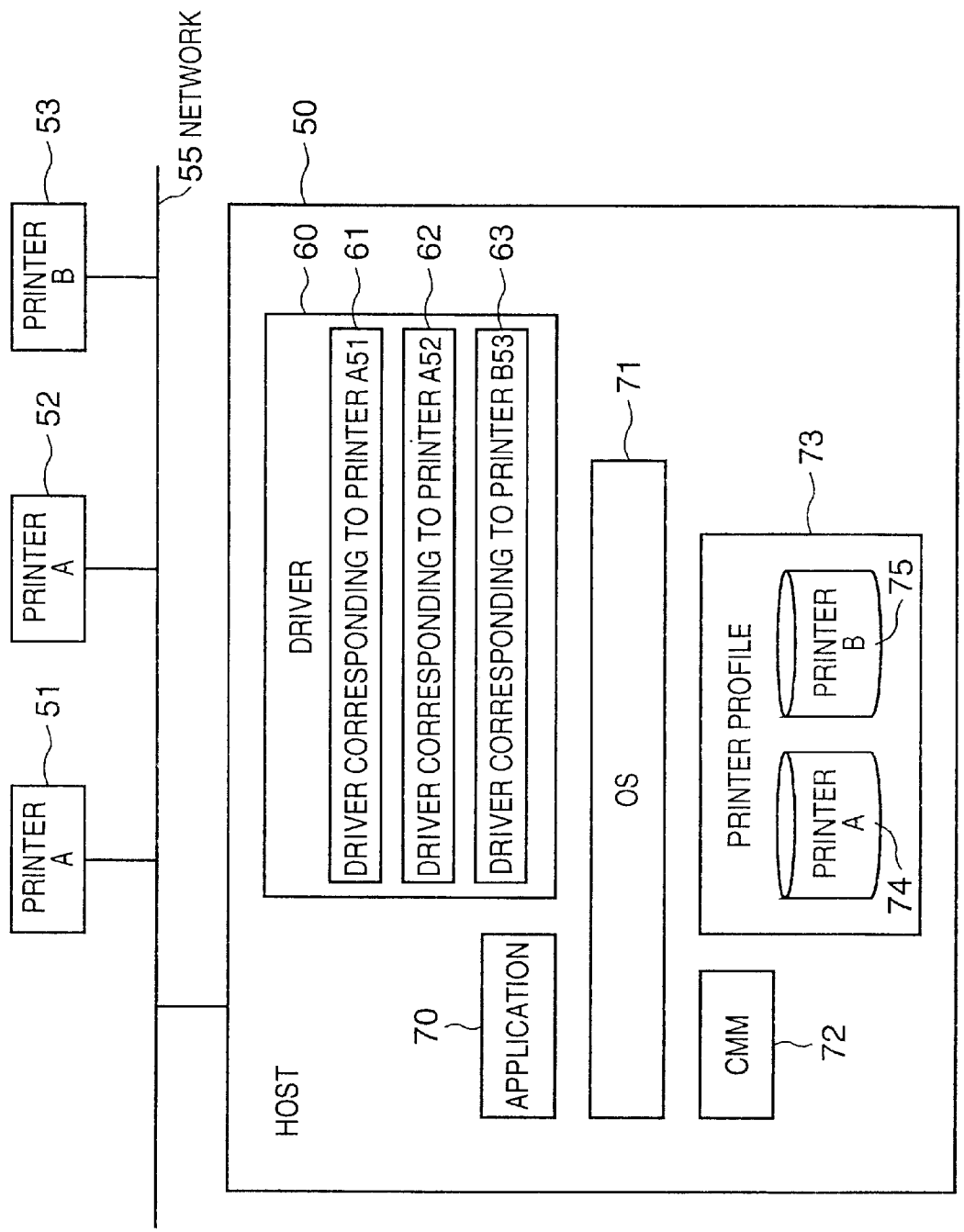
FIG. 7 is a diagram showing the software composition of a host capable of executing calibration of a printer connected to a network according to a second embodiment of the invention.
Figure 10:
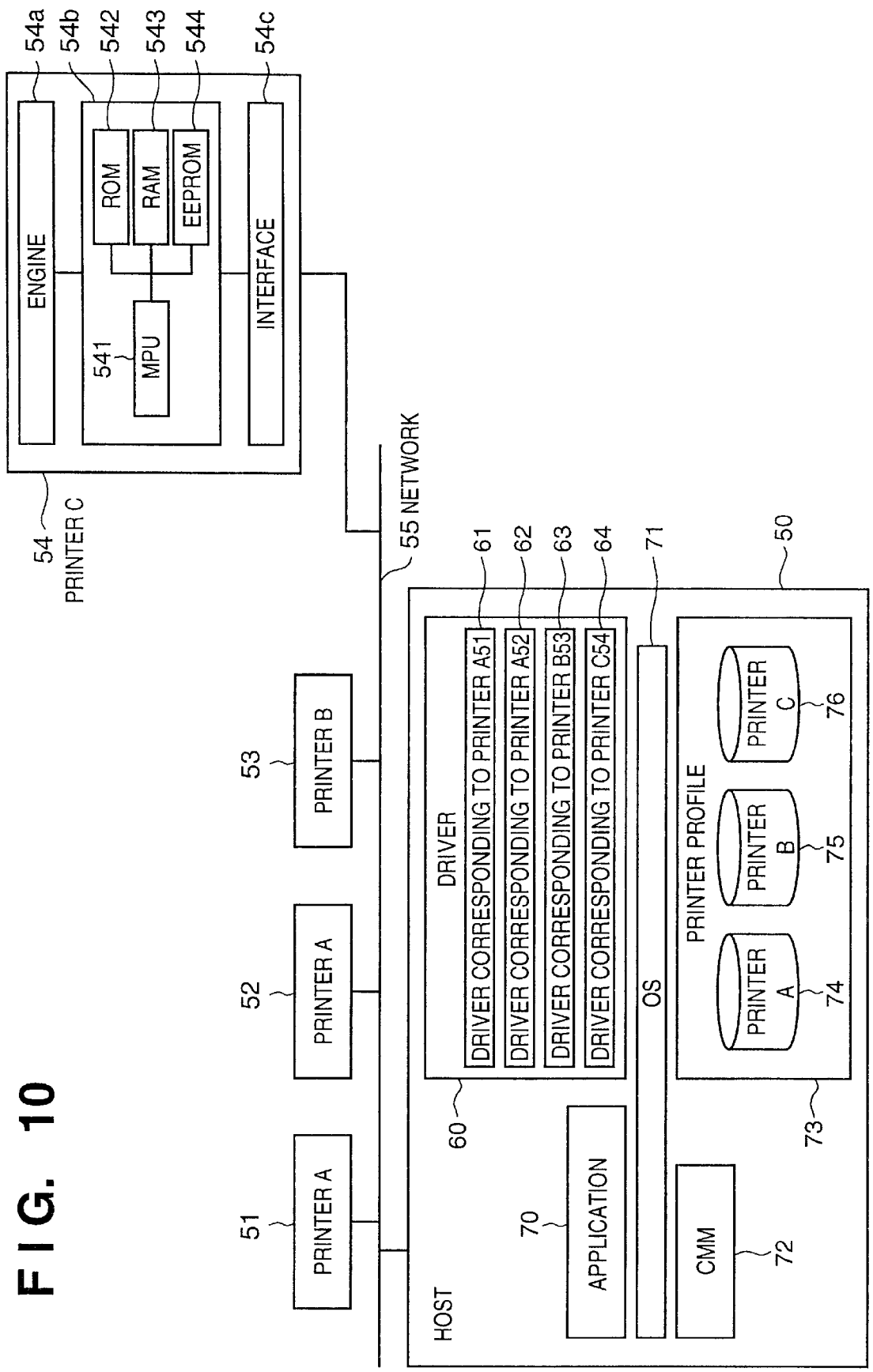
FIG. 10 is a block diagram showing the configuration of a printer network system connecting printers having a calibration function according to a third embodiment of the invention.

FIG. 10 is a block diagram showing the configuration of a printer network system connecting printers having a calibration function according to this embodiment of the invention. Constituent elements in FIG. 10 identical with those described in FIG. 7 are designated by like reference characters.

Numeral 54 in FIG. 10 denotes a printer C equipped with a calibration function. The printer C 54 comprises a printer engine 54a for forming an image on a recording medium, a controller 54b for executing overall printer control, control for communication with the host, image processing and calibration, and an interface 54c for performing bidirectional communication via the network 55.

The printers 51–54 and the host 50 communicate bidirectionally and exchange information necessary for image formation processing.

The controller 54b includes an MPU 541, a ROM 542 storing various control programs (inclusive of a program for calibration processing) executed by the MPU 541, a RAM 543 used as a work area for control program execution and a temporary storage area for storage of image data received from the host, and an EEPROM 544 storing the latest CMYK one-dimensional LUTs (CAL data) obtained as the result of calibration.

It should be noted that a driver 64 corresponding to the printer C 54 is installed in the host 50 and that the host 50 retains a printer profile 76 for the printer C 54.

Figure 11:
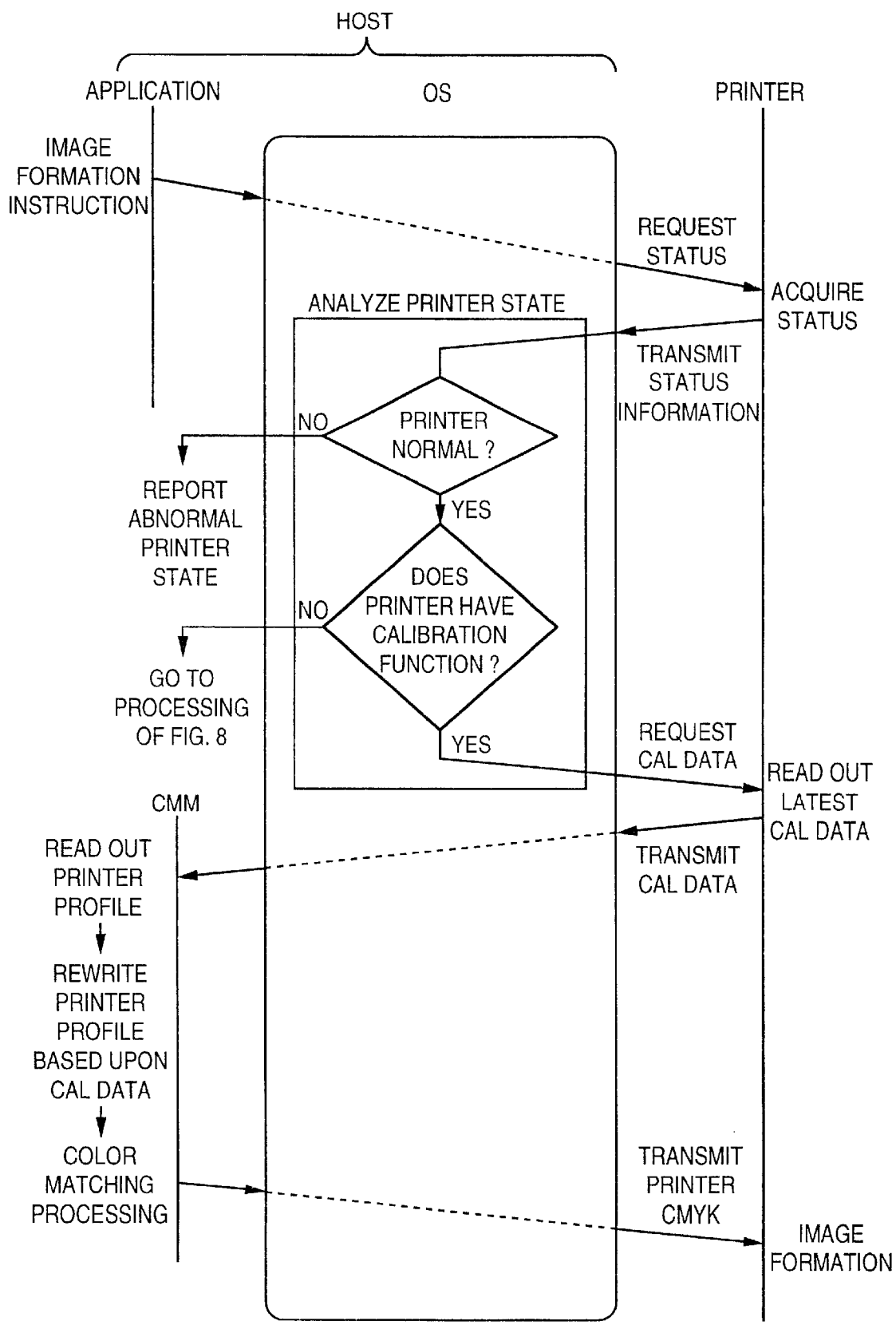
FIG. 11 is a diagram showing an exchange of information between a host and a printer in the formation of an image in accordance with the third embodiment.

Reference will be had to FIG. 11 to describe image formation processing executed by cooperation between the printer and host in a printer network of the kind shown in FIG. 7 to which the printer shown in FIG. 10 is connected.

First, if image formation processing accompanying color matching processing is designated from the application 70, the operating system 71 of the host 50 requests the printer, which is to form the image, for status information. The printer selected by the host 50 responds to the request by transmitting the status information to the host 50. The status information includes the model name of the printer, the state of the printer (e.g., inclusive of information indicating whether the printer has run out of paper, ink or toner, etc.) and information indicating whether or not the printer possesses a calibration function.

The operating system 71 of the host 50 analyzes the status information received and determines whether the state of the selected printer is normal or not. If it is judged that the state of the printer is not normal, then the user is so notified by displaying a message to this effect on the screen of the display with which the host 50 is provided. If the state of the printer is normal, on the other hand, then processing proceeds to the next step and it is determined whether the selected printer has a calibration function.

If it is judged that the printer does not have the calibration function, i.e., if a printer other than the printer C 54 has been selected, then processing similar to that illustrated in FIG. 8 described in connection with the second embodiment is executed. If the printer does possess the calibration function, on the other hand, i.e., if the printer C 54 has been selected, then the operating system 71 requests the printer C 54 for CAL data. The printer C 54 responds to the request by reading out the latest CAL data stored in the EEPROM 544 and transmitting the CAL data to the host 50.

The operating system 71 of the host 50 reads a printer profile of the kind shown in FIG. 3 (here the printer profile 76 corresponding to the printer C 54) out of the profile 73 and rewrites the set 30 of one-dimensional LUTs of "B to A" information based upon the received CAL data in the manner described in the first embodiment.

The operating system 71 subsequently executes color matching processing, outputs the printer CMYK that has undergone color matching processing to the printer C 54 via the driver 64 that corresponds to the printer C 54 and executes image formation processing.

Thus, as described above, this embodiment is such that if a printer selected to form an image possesses a calibration function, the printer is capable of using CMYK one-dimensional LUTs (CAL data) updated automatically. As a result, processing load related to calibration processing can be distributed to the printer and host. Further, since the latest calibration data can be obtained from the printer at this time, it is possible to carry out excellent image formation that reflects the latest color reproduction characteristic of the printer.

Furthermore, since calibration data is managed by the printer, management by the host is eliminated. This contributes to a lighter processing load upon the host in a printer network system having a plurality of printers.

Furthermore, in a case where elements constituting the printer network system shown in FIG. 10 are connected to each other via Ethernet LAN and TCP/IP protocol is available for the communication, at may be arranged that the Host 50 stores IP addresses of the printers into corresponding profiles, strored in the printer profile 73, each corresponding to each type of printers. By this arrangement, the Host 50 can identify a particular printer by using an IP address which is a function of TCP/IP, and use a CMYK one-dimensional LUT (CAL data) which was automatically updated by the printer.

It goes without saying that the object of the present invention can also be achieved by providing a storage medium storing the program codes of the software for performing the aforesaid functions of the foregoing embodiments to a system or an apparatus, reading the program codes with a computer (e.g., a CPU or MPU) of the system or apparatus from the storage medium, and then executing the program.

In this case, the program codes read from the storage medium implement the novel functions of the invention, and the storage medium storing the program codes constitutes the invention.

Further, the storage medium, such as a floppy disk, hard disk, optical disk, magneto-optical disk, CD-ROM, CD-R, magnetic tape, non-volatile type memory card or ROM can be used to provide the program codes.

Furthermore, besides the case where the aforesaid functions according to the embodiments are implemented by executing the program codes read by a computer, the present invention covers a case where an operating system or the like working on the computer performs a part of or the entire process in accordance with the designation of program codes and implements the functions according to the embodiment.

Furthermore, the present invention further covers a case where, after the program codes read from the storage medium are written in a function extension board inserted into the computer or in a memory provided in a function extension unit connected to the computer, a CPU or the like contained in the function extension board or function extension unit performs a part of or the entire process in accordance with the designation of program codes and implements the function of the above embodiments.

As many apparently widely different embodiments of the present invention can be made without departing from the spirit and scope thereof, it is to be understood that the invention is not limited to the specific embodiments thereof except as defined in the appended claims.

What is claimed is:

1. An image processing method comprising:
    a calibrating step of calibrating a set of one-dimensional correction LUTs in accordance with a color reproduction characteristic of an output device;
    a first modifying step of modifying, on the basis of the calibrated set of one-dimensional correction LUTs, a first set of one-dimensional conversion LUTs, that has been stored in a profile corresponding to the output device, used for converting device-independent data to output device-dependent data which is dependent upon the output device; and
    a second modifying step of modifying, on the basis of the calibrated set of one-dimensional correction LUTs, a second set of one-dimensional conversion LUTs, that has been stored in the profile corresponding to the output device and different than the first set of one-dimensional conversion LUTs, the second set of one-dimensional conversion LUTs used for converting output device-dependent data to device-independent data.

2. The method according to claim 1, wherein the profile includes an output profile that describes the output characteristic of the output device, and
    said output profile includes, as color processing data for converting the device-independent data to the data dependent upon the output device, a first 3×3 matrix, a first set of three one-dimensional LUTs, a first three-dimensional LUT, and a first set of N one-dimensional LUTs; and
    further includes, as color processing data for converting the data dependent upon the output device to the device-independent data, a second set of N one-dimensional LUTs, a second N-dimensional LUT, a second set of three one-dimensional LUTs, and a second 3×3 matrix.

3. The method according to claim 2, further comprising a first conversion step of converting the device-independent data to the data dependent upon the output device by applying processing using the first 3×3 matrix, the first set of three one-dimensional LUTs, the first three-dimensional LUT and the first set of N one-dimensional LUTs in the order mentioned.

4. The method according to claim 3, further comprising a second conversion step of converting the data dependent upon the output device to the device-independent data by applying processing using the second 3×3 matrix, the second set of three one-dimensional LUTs, the second N-dimensional LUT and the second set of N one-dimensional LUTs in the order mentioned.

5. The method according to claim 4, wherein the profile further includes an input profile that describes a display characteristic of a display device that displays an image; and
    said input profile includes, as color processing data for converting the device-independent data to the data dependent upon the display device, a third 3×3 matrix and a third set of N one-dimensional LUTs.

6. The method according to claim 5, further comprising a third conversion step of converting the device-independent data to the data dependent upon the display device by applying processing using the third 3×3 matrix and the third set of N one-dimensional LUTs in the order mentioned.

7. The method according to claim 5, wherein the display device is a display monitor and data displayed by said display monitor is defined by RGB space.

8. The method according to claim 1, wherein the output device is a printer and data printed by said printer is defined by CMYK space.

9. The method according to claim 1, wherein the device-independent data is defined by XYZ space.

10. The method according to claim 1, wherein the set of one-dimensional LUTs is stored together with calibration information but separately from the profile.

11. The method according to claim 1, further comprising a transfer step of transferring the set of one-dimensional LUTs to a device driver corresponding to the output device.

12. An image processing apparatus comprising:
    calibrating means for calibrating a set of one-dimensional correction LUTs in accordance with a color reproduction characteristic of an output device;
    first modifying means for modifying, on the basis of the calibrated set of one-dimensional correction LUTs, a first set of one-dimensional conversion LUTs, that has been stored in a profile corresponding to the output device, used for converting device-independent data to output device-dependent data which is dependent upon the output device; and
    second modifying means for modifying, on the basis of the calibrated set of one-dimensional correction LUTs, a second set of one-dimensional conversion LUTs, that has been stored in the profile corresponding to the output device and different than the first set of one-dimensional conversion LUTs, the second set of one-dimensional conversion LUTs used for converting output device-dependent data to device-independent data.

13. The apparatus according to claim 12, wherein the profile includes an output profile that describes the output characteristic of the output device, and
    said output profile includes, as color processing data for converting the device-independent data to the data dependent upon the output device, a first 3×3 matrix, a first set of three one-dimensional LUTs, a first three-dimensional LUT, and a first set of N one-dimensional LUTs; and further includes, as color processing data for converting the data dependent upon the output device to the device-independent data, a second set of N one-dimensional LUTS, a second N-dimensional LUT, a second set of three one-dimensional LUTs, and a second 3×3 matrix.

14. The apparatus according to claim 13, further comprising first converting means for converting the device-independent data to the data dependent upon the output device by applying processing using the first 3×3 matrix, the first set of three one-dimensional LUTS, the first three-dimensional LUT and the first set of N one-dimensional LUTs in the order mentioned.

15. The apparatus according to claim 14, further comprising second converting means for converting the data dependent upon the output device to the device-independent data by applying processing using the second 3×3 matrix, the second set of three one-dimensional LUTs, the second N-dimensional LUT and the second set of N one-dimensional LUTs in the order mentioned.

16. A computer program product comprising a computer readable medium having computer program codes, for executing image processing, said product including:

calibration process procedure codes for executing processing for calibrating a set of one-dimensional correction LUTs in accordance with a color reproduction characteristic of an output device;

first modification process procedure codes for modifying, on the basis of the calibrated set of one-dimensional correction LUTs, a first set of one-dimensional conversion LUTs, that has been stored in a profile corresponding to the output device, used for converting device-independent data to output device-dependent data which is dependent upon the output device; and second modification process procedure codes for modifying, on the basis of the calibrated set of one-dimensional correction LUTs, a second set of one-dimensional conversion LUTs, that has been stored in the profile corresponding to the output device and different than the first set of one-dimensional conversion LUTs, the second set of one-dimensional conversion LUTs used for converting output device-dependent data to device-independent data.

17. An image processing method comprising:

a calibrating step of calibrating a set of one-dimensional correction LUTs in accordance with a color reproduction characteristic of an output device;

a storing step of storing the calibrated set of one-dimensional correction LUTs into a memory separately from a profile that describes an output characteristic of the output device;

a modifying step of modifying, on the basis of the calibrated set of one-dimensional correction LUTs, when color matching processing is executed using the profile, a set of one-dimensional conversion LUTs which is different than the calibrated set of one-dimensional correction LUTs and which is stored in the profile corresponding to the output device, the set of one-dimensional conversion LUTs for converting device-independent data to data dependent upon the output device; and a color matching execution step of executing color matching processing using the profile which stores the modified set of one-dimensional conversion LUTs.

18. An image processing apparatus comprising:

calibrating means for calibrating a set of one-dimensional correction LUTs in accordance with a color reproduction characteristic of an output device;

first storage means for storing the calibrated set of one-dimensional correction LUTs calibrated by said calibrating means;

second storage means for storing a profile that describes an output characteristic of the output device;

modifying means for modifying, on the basis of the calibrated set of one-dimensional correction LUTs, when color matching processing is executed using the profile, a set of one-dimensional conversion LUTs which is different than the calibrated set of one-dimensional correction LUTs and which is stored in the profile corresponding to the output device, the set of one-dimensional conversion LUTs for converting device-independent data to data dependent upon the output device; and color matching execution means for executing color matching processing using the profile which stores the modified set of one-dimensional conversion LUTs.

19. A computer program product comprising a computer readable medium having computer program codes, for executing image processing, said product including:

calibration process procedure codes for calibrating a set of one-dimensional correction LUTs in accordance with a color reproduction characteristic of an output device;

storing process procedure codes for executing processing for storing the calibrated set of one-dimensional correction LUTs into a memory separately from a profile that describes an output characteristic of the output device;

modification process procedure codes for modifying, on the basis of the calibrated set of one-dimensional correction LUTs, when color matching processing is executed using the profile, a set of one-dimensional conversion LUTs which is different than the calibrated set of one-dimensional correction LUTs and which is stored in the profile corresponding to the output device, the set of one-dimensional conversion LUTs for converting device-independent data to data dependent upon the output device; and color processing execution procedure codes for executing color matching processing using the profile which stores the modified set of one-dimensional conversion LUTs.

20. Computer-executable process steps stored on a computer readable medium, said computer-executable process steps for executing image processing, the computer executable process steps comprising:

a calibration process procedure step to execute processing for calibrating a set of one-dimensional correction LUTs in accordance with a color reproduction characteristic of an output device;

a first modification process procedure step for modifying, on the basis of the calibrated set of one-dimensional correction LUTs, a first set of one-dimensional conversion LUTs, that has been stored in a profile corresponding to the output device, used for converting device-independent data to output device-dependent data which is dependent upon the output device; and a second modification process procedure step for modifying, on the basis of the calibrated set of one-dimensional correction LUTs, a second set of one-dimensional conversion LUTs, that has been stored in the profile corresponding to the output device and different than the first set of one-dimensional conversion LUTs, the second set of one-dimensional conversion LUTs used for converting output device-dependent data to device-independent data.

21. Computer-executable process steps stored on a computer readable medium, said computer-executable process steps for executing image processing, the computer executable process steps comprising:

a calibration process procedure step for calibrating a set of one-dimensional correction LUTs in accordance with a color reproduction characteristic of an output device;

a storing process procedure step for executing processing for storing the calibrated set of one-dimensional correction LUTs into a memory separately from a profile that describes an output characteristic of the output device;

a modification process procedure step for modifying, on basis of the calibrated set of one-dimensional correction LUTs, when color matching processing is executed using the profile, a set of one-dimensional conversion LUTs which is different than the calibrated set of one-dimensional correction LUTs and which is stored in the profile corresponding to the output device, the set of one-dimensional conversion LUTs for converting device-independent data to data dependent upon the output device; and a color processing execution procedure step for executing color matching processing using the profile which stores the modified set of one-dimensional conversion LUTs.

* * * * *

UNITED STATES PATENT AND TRADEMARK OFFICE
CERTIFICATE OF CORRECTION

PATENT NO. : 6,643,029 B2
DATED : November 4, 2003
INVENTOR(S) : Kumada et al.

It is certified that error appears in the above-identified patent and that said Letters Patent is hereby corrected as shown below:

Column 4,
Line 29, "LUTS," should read -- LUTs, --.

Column 9,
Line 22, "LUTS," should read -- LUTs, --.

Column 17,
Lines 7 and 14, "LUTS," should read -- LUTs, --.

Column 20,
Line 2, "basis" should read -- the basis --.

Signed and Sealed this

Twenty-seventh Day of July, 2004

JON W. DUDAS
*Acting Director of the United States Patent and Trademark Office*